United States Patent
Mironets et al.

(10) Patent No.: US 10,392,958 B2
(45) Date of Patent: *Aug. 27, 2019

(54) HYBRID BLADE OUTER AIR SEAL FOR GAS TURBINE ENGINE

(71) Applicant: UNITED TECHNOLOGIES CORPORATION, Hartford, CT (US)

(72) Inventors: Sergey Mironets, Norfolk, CT (US); Edward F. Pietraszkiewicz, Southington, CT (US); Alexander Staroselsky, Avon, CT (US); Mark F. Zelesky, Bolton, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 687 days.

This patent is subject to a terminal disclaimer.

(21) Appl. No.: 14/721,223

(22) Filed: May 26, 2015

(65) Prior Publication Data

US 2015/0252682 A1    Sep. 10, 2015

Related U.S. Application Data

(63) Continuation of application No. 13/343,689, filed on Jan. 4, 2012, now Pat. No. 9,169,739.

(51) Int. Cl.
   *F01D 11/12*    (2006.01)
   *F01D 5/14*    (2006.01)

(52) U.S. Cl.
   CPC .............. *F01D 11/12* (2013.01); *F01D 5/14* (2013.01); *F01D 11/122* (2013.01);
   (Continued)

(58) Field of Classification Search
   CPC .......... F01D 25/10; F01D 25/12; F01D 25/14; F01D 25/145; F01D 11/00; F01D 11/08;
   (Continued)

(56) References Cited

U.S. PATENT DOCUMENTS 3,365,172 A    1/1968  McDonough et al.
3,547,455 A *  12/1970  Daunt ................... F01D 11/02
                                                       277/415
(Continued)

FOREIGN PATENT DOCUMENTS

EP    1253294    10/2002
EP    2014784    1/2009
(Continued)

OTHER PUBLICATIONS

European Search Report for European Application No. 13150281.7, dated Apr. 4, 2013.
(Continued)

*Primary Examiner* — Carlos A Rivera
*Assistant Examiner* — Wayne A Lambert
(74) *Attorney, Agent, or Firm* — Carlson, Gaskey & Olds, P.C.

(57) ABSTRACT

A Blade Outer Air Seal (BOAS) includes a body manufactured of a metal alloy, the body includes a face opposite a forward interface and an aft interface, the face includes a cavity. A non-metallic insert within the cavity such that the insert is flush with the face.

12 Claims, 4 Drawing Sheets

(52) U.S. Cl.
CPC .... *F05D 2230/236* (2013.01); *F05D 2240/11* (2013.01); *Y02T 50/672* (2013.01); *Y02T 50/6765* (2018.05); *Y10T 29/49236* (2015.01)

(58) Field of Classification Search
CPC .... F01D 11/12; F01D 11/122; F05D 2240/11; F05D 2240/14; F05D 2240/15; F05D 2230/236; Y10T 29/49236; Y02T 50/672
See application file for complete search history.

(56) References Cited

U.S. PATENT DOCUMENTS

| | | | |
|---|---|---|---|
| 3,825,364 A | 7/1974 | Halila et al. | |
| 4,087,199 A | 5/1978 | Hemsworth et al. | |
| 4,251,185 A | 2/1981 | Karstensen | |
| 4,273,824 A | 6/1981 | McComas et al. | |
| 4,303,371 A * | 12/1981 | Eckert | F01D 11/08 415/116 |
| 4,318,666 A | 3/1982 | Pask | |
| 4,329,113 A | 5/1982 | Ayache et al. | |
| 4,422,648 A | 12/1983 | Eaton et al. | |
| 4,452,565 A | 6/1984 | Monhardt et al. | |
| 4,481,237 A | 11/1984 | Bosshart et al. | |
| 4,503,130 A | 3/1985 | Bosshart et al. | |
| 4,527,385 A | 7/1985 | Jumelle et al. | |
| 4,536,127 A | 8/1985 | Rossman et al. | |
| 4,573,865 A * | 3/1986 | Hsia | F01D 5/187 165/109.1 |
| 4,588,607 A | 5/1986 | Matarese et al. | |
| 4,596,116 A | 6/1986 | Mandet et al. | |
| 4,679,981 A | 7/1987 | Guibert et al. | |
| 5,030,060 A | 7/1991 | Liang | |
| 5,584,651 A | 12/1996 | Pietraszkiewicz et al. | |
| 5,649,806 A | 7/1997 | Scricca et al. | |
| 5,705,231 A | 1/1998 | Nissley et al. | |
| 5,993,150 A | 11/1999 | Liotta et al. | |
| 6,001,492 A | 12/1999 | Jackson et al. | |
| 6,142,731 A | 11/2000 | Dewis et al. | |
| 6,187,453 B1 | 2/2001 | Maloney | |
| 6,358,002 B1 | 3/2002 | Good et al. | |
| 6,652,227 B2 | 11/2003 | Fried | |
| 6,758,653 B2 | 7/2004 | Morrison | |
| 6,764,779 B1 | 7/2004 | Liu et al. | |
| 7,063,503 B2 * | 6/2006 | Meisels | F01D 25/24 415/116 |
| 7,534,076 B2 | 5/2009 | Agehara et al. | |
| 7,597,533 B1 | 10/2009 | Liang | |
| 7,641,440 B2 | 1/2010 | Morrison et al. | |
| 7,665,962 B1 | 2/2010 | Llang | |
| 2004/0012152 A1 | 1/2004 | Grunke et al. | |
| 2006/0147303 A1 | 7/2006 | Harris | |
| 2008/0159850 A1 | 7/2008 | Tholen et al. | |
| 2009/0028697 A1 | 1/2009 | Shi et al. | |
| 2009/0053554 A1 | 2/2009 | Strock et al. | |

FOREIGN PATENT DOCUMENTS

| | | |
|---|---|---|
| EP | 2395129 | 12/2011 |
| GB | 2139293 | 11/1984 |

OTHER PUBLICATIONS

Jane's Aero-Engines; "Pratt and Whitney PW8000", Mar. 2000, Issue 7.

\* cited by examiner

HYBRID BLADE OUTER AIR SEAL FOR GAS TURBINE ENGINE

RELATED APPLICATIONS

This application is a continuation of prior U.S. application Ser. No. 13/343,689, filed Jan. 4, 2012, the entirety of which is herein incorporated by reference.

BACKGROUND

The present application relates to a blade outer air seal (BOAS).

Gas turbine engines generally include fan, compressor, combustor and turbine sections along an engine axis of rotation. The fan, compressor, and turbine sections each include a series of stator and rotor blade assemblies. A rotor and an axially adjacent array of stator assemblies may be referred to as a stage. Each stator vane assembly increases efficiency through the direction of core gas flow into or out of the rotor assemblies.

An outer case includes a blade outer air seal (BOAS) assembly to provide an outer radial flow path boundary for the core gas flow. A multiple of BOAS segments are typically provided to accommodate thermal and dynamic variation typical in a high pressure turbine (HPT) section of the gas turbine engine. The BOAS segments are subjected to relatively high temperatures and receive a secondary cooling airflow for temperature control.

SUMMARY

A Blade Outer Air Seal (BOAS) according to an exemplary aspect of the present disclosure includes a body manufactured of a metal alloy, the body includes a face opposite a forward interface and an aft interface, the face includes a cavity. A non-metallic within the cavity such that the insert is flush with the face.

A Blade Outer Air Seal (BOAS) according to an exemplary aspect of the present disclosure includes a body manufactured of a metal alloy, the body includes a face opposite a forward interface and an aft interface, the face includes a cavity. A non-metallic within the cavity such that the insert is flush with the face. An intermediate bonding layer between the cavity and the non-metallic insert.

A method of assembling a Blade Outer Air Seal (BOAS) for a gas turbine engine according to an exemplary aspect of the present disclosure includes mounting a non-metallic insert within a cavity such that the first non-metallic insert is flush with a face of a BOAS segment; and buffering the non-metallic insert buffering within the cavity through an intermediate bonding layer.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
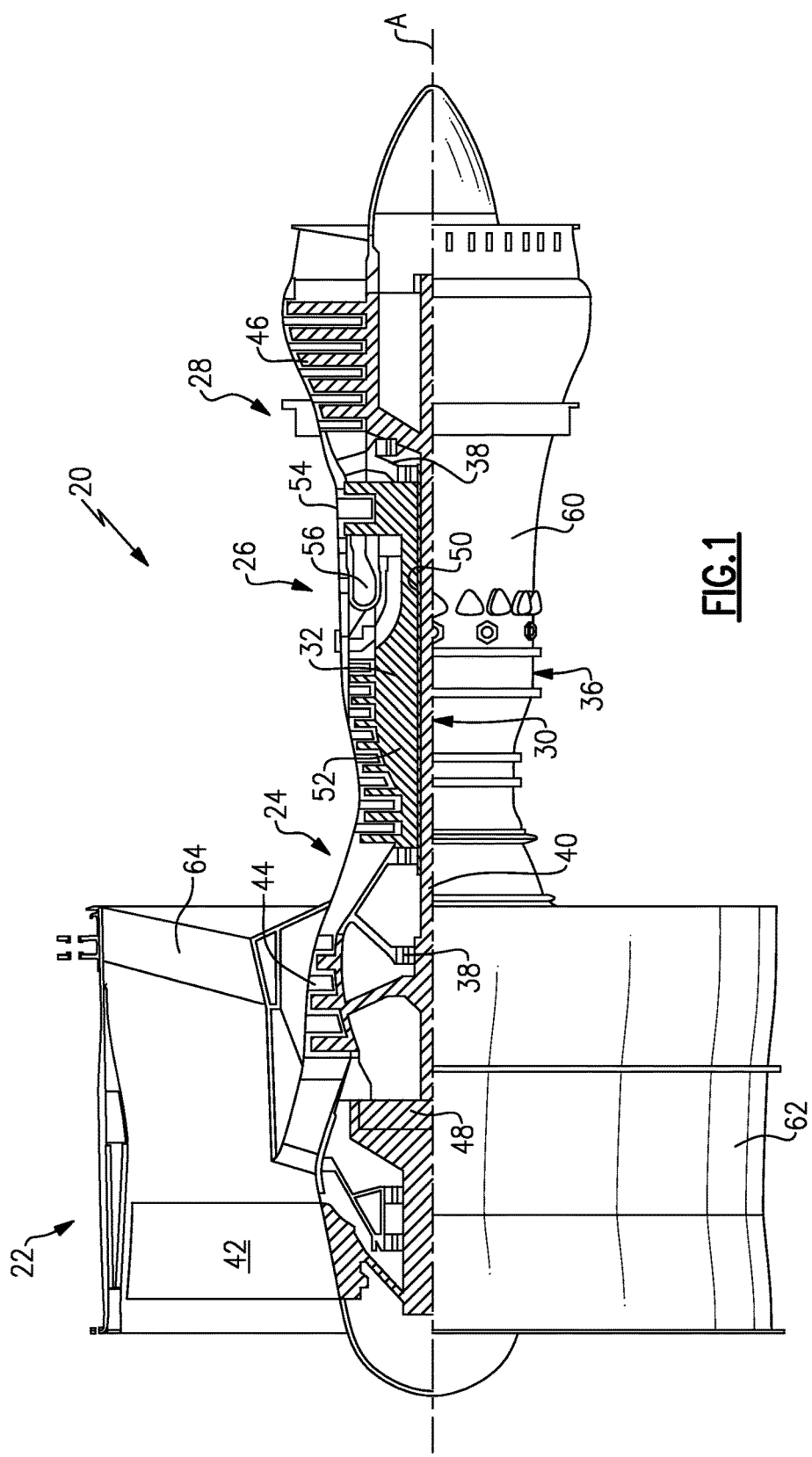
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features, or, may not include the fan section 22 such as that for industrial gas turbine engines. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, such as three-spool architectures.

The engine 20 generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44 and a low pressure turbine 46. The inner shaft 40 may be connected to the fan 42 directly or through a geared architecture 48 (a geared turbofan engine enabling a high flow bypass ratio) to drive the fan 42 at a lower speed than the low spool 30 which in one disclosed non-limiting embodiment includes a gear reduction ratio of greater than 2.5:1. The high spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A that is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low spool 30 and high spool 32 in response to the expansion.

The engine static structure 36 is generally defined by a core case 60 and a fan case 62. The fan case 62 is at least partially supported relative to the core case 60 by a multiple of Fan Exit Guide Vanes (FEGVs) 64. The core case 60 is often referred to as the engine backbone and supports the rotational componentry therein.

Figure 2:
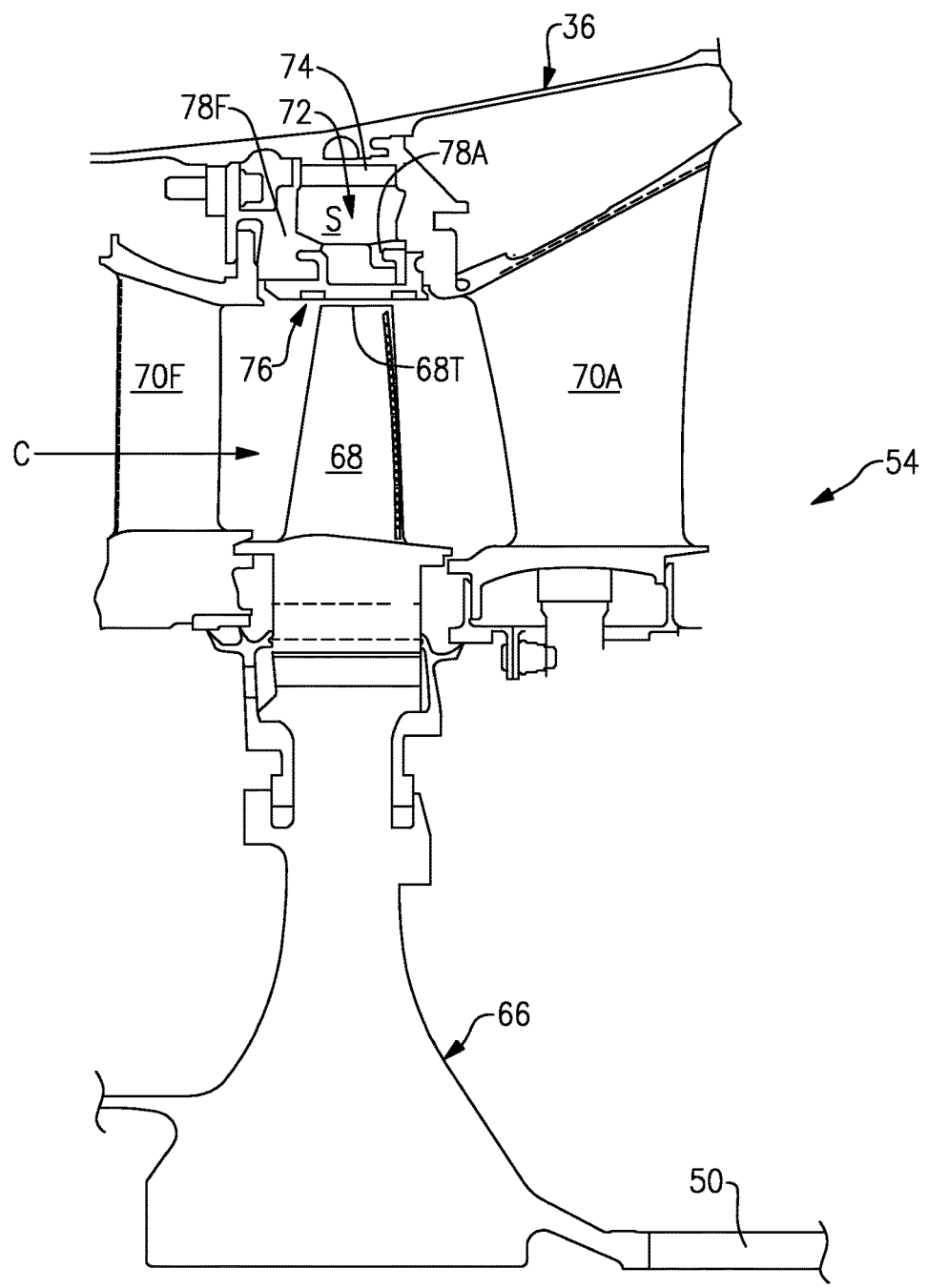
FIG. 2 is a schematic cross-sectional view of a BOAS assembly within a turbine section of the gas turbine engine.

With reference to FIG. 2, the turbine, such as high pressure turbine 54 of the high spool 32 are defined about the engine central longitudinal axis A. A high pressure turbine rotor disk 66 (one shown) is mounted to the outer shaft 50 to rotate as a unit with respect to the engine static structure 36. The high pressure turbine 54 includes alternate rows of rotary airfoils 68 mounted to the disk 66 that alternate with cascades of vanes 70F, 70A (two shown schematically) also supported within the core case 60. In the disclosed, non-limiting embedment, a two stage high pressure turbine 54 are schematically illustrated; however, any number of stages will benefit herefrom.

Each of the airfoils 68 includes a distal end that defines a blade tip 68T which extend toward a Blade Outer Air Seal (BOAS) assembly 72. The BOAS assembly 72 may find beneficial use in many industries including aerospace, industrial, electricity generation, naval propulsion, pumping sets for gas and oil transmission, aircraft propulsion, vehicle engines, and stationary power plants.

The BOAS assembly 72 is disposed in an annulus radially between the engine static structure 36 and the turbine blade tips 68T. The BOAS assembly 72 generally includes a blade outer air seal (BOAS) support structure 74 and a multiple of blade outer air seal (BOAS) segments 76 (one shown in FIG. 3). The BOAS support structure 74 is mounted within the engine static structure 36 to define forward and aft flanges 78F, 78A to receive the BOAS segments 76. The forward flanges 78F and the aft flanges 78A may be manufactured or a metal alloy material and be circumferentially segmented for receipt of the BOAS segments 76 in a circumferentially rotated and locked arrangement as generally understood.

Figure 3:
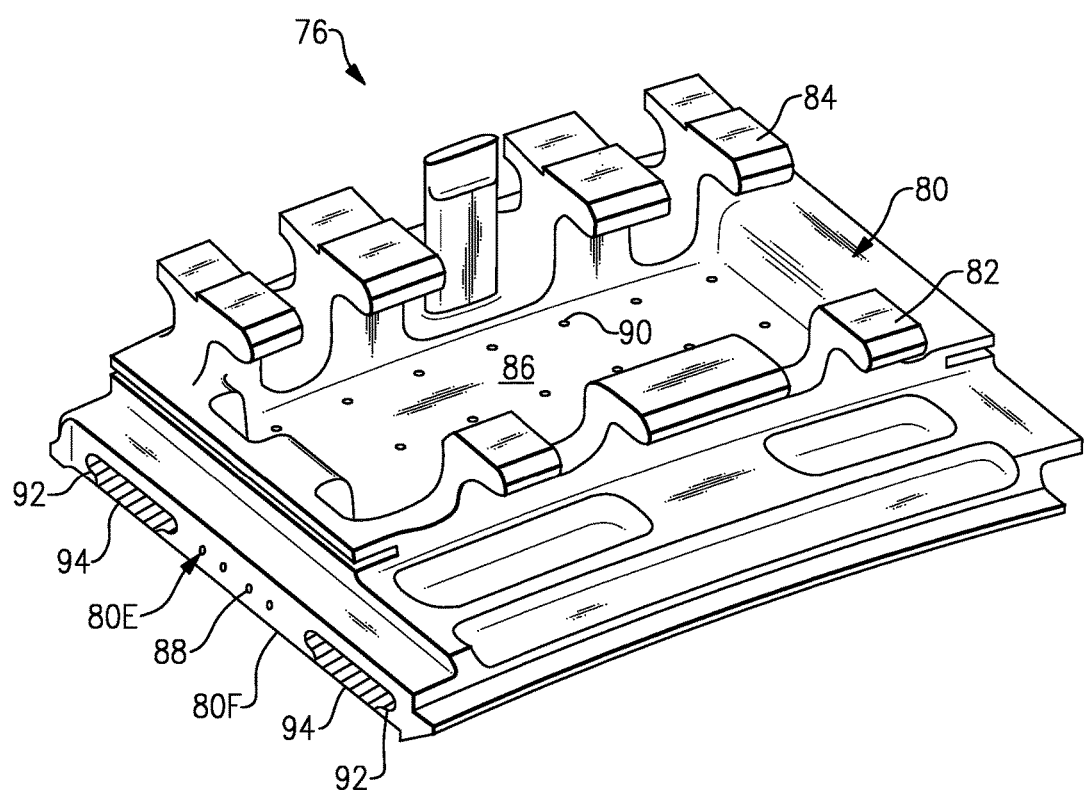
FIG. 3 is a perspective view of the BOAS assembly.

With reference to FIG. 3, each BOAS segment 76 includes a body 80 that defines a forward interface 82 and an aft interface 84 opposite a face 80F that is adjacent to the turbine blade tips 68T (FIG. 2). The body 80 of each BOAS segment 76 is a unitary structure with the forward interface 82 and the aft interface 84 manufactured of, for example, nickel based superalloys or other metallic materials. The forward interface 82 and the aft interface 84 respectively engage the flanges 78F, 78A to secure each BOAS segment 76 (FIG. 2). That is, the forward interface 82 and an aft interface 84 engage with the flanges 78A, 78F and form a metal alloy to metal alloy static structure interface. The interface facilitate engine structural rigidity and durability. The circumferentially adjacent faces 80F of the BOAS segments 76 provide a turbine blade rub path formed by the rotational passage of the turbine blade tips 68T relative to the static BOAS segments 76. It should also be understood that various interfaces and BOAS assemblies may alternatively be provided.

Each BOAS segment 76 includes a cavity 86 generally between and on the same side as the forward interface 82 and the aft interface 84 to receive a secondary cooling airflow. The cavity 86 is in communication with a multiple of edge holes 88 and a multiple of film cooling holes 90 to provide flow communication for the secondary cooling air S into the core gas path flow C (FIG. 2). The multiple of edge holes 88 are arranged generally circumferentially and the multiple of film cooling holes 90 are arranged generally radially with respect to the engine axis A. It should be understood that various numbers, sizes, orientations and arrangements may be provided and that the holes 88, 90 are illustrated somewhat schematically.

Each BOAS segment 76 further includes at least one cavity 92 (two shown) within the face 80F opposite the forward interface 82 and the aft interface 84 which receives an insert 94 of a refractory ceramic material such as a silicon carbide, silicon nitride as well as other non-metallic ceramic and Ceramic Matrix Composite (CMC) materials or combinations thereof. The cavities 92 may extend through each circumferential edge 80E such that the inserts 94 may define a circumferential ring about axis A.

Figure 4:
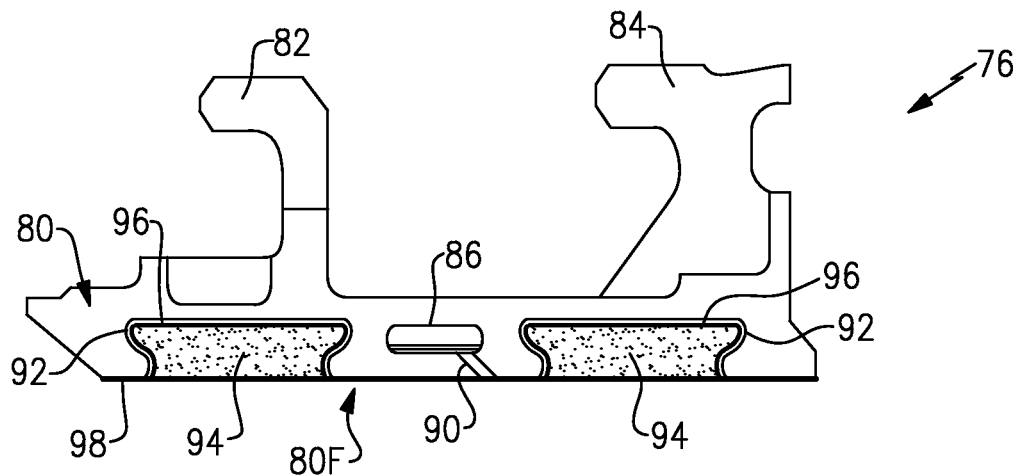
FIG. 4 is a sectional view of the BOAS segment according to one non-limiting embodiment.

With reference to FIG. 4, the insert 94 is flush with the face 80F such that the inserts 94 are adjacent to or at least partially within the turbine blade rub path formed by the rotational passage of the turbine blade tips 68T. That is, the inserts 94 essentially form complete circumferential rings or segmented circumferential rings about the engine axis A. The inserts 94 reduce metal surface temperatures of the BOAS segment 76 and thereby minimize cooling flow requirements and increases component life.

An abradable ceramic thermal barrier coating (TBC) 98 may be located over the face 80F and inserts 94 to further increase the durability of each BOAS segment 76. The coating 98 functions to protect the BOAS segment 76 from oxidation, corrosion, and thermal-mechanical fatigue. The coating 98 is typically removed over the life of the BOAS segment 76 by the rotation of turbine blade tips 68T adjacent thereto to provides a minimum clearance such that core gas flow around the turbine blade tips 68T is reduced. The graded ceramic-metal transition in composition across an interface can be tailored to a part specific configuration to substantially reduce the thermal stresses. The required level of interface bonding is achieved by providing either linear or non-linear composition variation when traversing the interface. The graded bonding layer composition variation may be determined experimentally.

Figure 5:
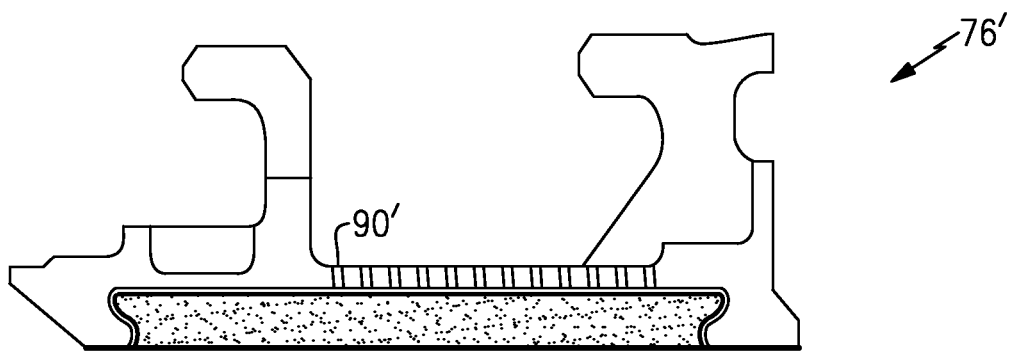
FIG. 5 is a schematic view of a BOAS assembly according to another non-limiting embodiment.

The cavities 92 may, in one disclosed, non-limiting embodiment, be located fore and aft of the film cooling holes 90 (FIG. 4). Alternatively, or in addition, film cooling holes 90' may be partially covered by the insets 94 such that additional film cooling holes 90' will be activated and exposed in case of refractory ceramic materials spallation (FIG. 5).

Each cavity 92 extends circumferentially around axis A and may be shaped in a dovetail or other directional cross-sectional shape which facilitate retention of the insert 94. That is, the cross-sectional shape of the each cavity 92 prevents liberation of the inset 94.

An intermediate bonding layer 96 is formed within each cavity 92 to provide a transitional interface between the metal alloy cavity 92 and the refractory ceramic material inset 94. The intermediate bonding layer 96 provides a buffer between the 100% metal alloy material body 80 and the 100% non-metal insert 94 to accommodate the mismatch in mechanical properties and thermal expansion of nickel based superalloys and refractory ceramic materials.

In one disclosed non-limiting embodiment, the gradient of the intermediate bonding layer 96 is 100% metal alloy adjacent to the body 80 and transition across a thickness to a 100% non-metal material. It should be appreciated that the transition gradient may be linear or non-linear as required. The particular gradient may be determined through design experimentation or testing to achieve the desired transition.

The intermediate bonding layer 96 may, for example, be a nanostructured functionally graded material (FGM). The FGM includes a variation in composition and structure gradually over volume, resulting in corresponding changes in the properties of the material for specific function and applications. Various approaches based on the bulk (particulate processing), preform processing, layer processing and melt processing are used to fabricate the FGM such as electron beam powder metallurgy technology, vapor deposition techniques, electrochemical deposition, electro discharge compaction, plasma-activated sintering, shock consolidation, hot isostatic pressing, Sulzer high vacuum plasma spray, etc.

The BOAS assembly 72 provides an approximately 2%-6% cooling flow reduction, weight reduction and improved Thrust Specific Fuel Consumption (TSFC) with a metal alloy attachment configuration which does not require modification to the forward and aft flanges 78F, 78A.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A Blade Outer Air Seal (BOAS) comprising:
   a body including a face opposite a forward interface and an aft interface, said face including a cavity;
   a non-metallic insert within said cavity such that said non-metallic insert is flush with said face; and
   an intermediate bonding layer between said cavity and said non-metallic insert, wherein the intermediate bonding layer is a functionally graded material (FGM), and wherein the intermediate bonding layer is 100% metal alloy adjacent the cavity and 100% non-metal adjacent the non-metallic insert.

2. The BOAS as recited in claim 1, wherein said cavity forms a directional cross-sectional shape.

3. The BOAS as recited in claim 1, wherein said intermediate bonding layer includes a gradient with respect to said face.

4. The BOAS as recited in claim 1, wherein said intermediate bonding layer includes a variation in composition and structure gradually over volume with respect to said face.

5. The BOAS as recited in claim 1, wherein said body is manufactured of a metal alloy.

6. The BOAS as recited in claim 1, wherein said body includes a multiple of film cooling holes covered by the non-metallic insert in a normal operating condition, and wherein said film cooling holes become activated and exposed in the case of spallation of the non-metallic insert.

7. The BOAS as recited in claim 6, wherein, when activated, the film cooling holes provide flow communication for a secondary flow into a core gas path flow.

8. A Blade Outer Air Seal (BOAS) comprising:
   a body includes a face opposite a forward interface and an aft interface, said face includes a cavity;
   a non-metallic insert within said cavity such that said non-metallic insert is flush with said face;
   an intermediate bonding layer between said cavity and said non-metallic insert, wherein the intermediate bonding layer is a functionally graded material (FGM); and
   wherein said body includes a multiple of film cooling holes covered by the non-metallic insert in a normal operating condition, and wherein said film cooling holes become activated and exposed in the case of spallation of the non-metallic insert.

9. The BOAS as recited in claim 8, further comprising a thermal barrier coating over at least one of said face and said insert.

10. The BOAS as recited in claim 8, wherein said cavity forms a directional cross-sectional shape.

11. The BOAS as recited in claim 8, wherein said body is manufactured of a metal alloy.

12. The BOAS as recited in claim 8, wherein, when activated, the film cooling holes provide flow communication for a secondary flow into a core gas path flow.

* * * * *